United States Patent [19]

Durand

[11] Patent Number: 5,024,085

[45] Date of Patent: Jun. 18, 1991

[54] SIGNAL PICKUP MECHANISM

[76] Inventor: John E. Durand, 26581 Dolorosa, Mission Viejo, Calif. 92691

[21] Appl. No.: 235,563

[22] Filed: Aug. 24, 1988

[51] Int. Cl.[5] ............................................. G01F 3/08
[52] U.S. Cl. ................................... 73/256; 73/272 R; 324/226
[58] Field of Search ................ 73/239, 247, 256, 257, 73/272 R, 861.77, 861.78, DIG. 1, DIG. 5, 223, 224; 324/207, 226, 228

[56]         References Cited
         U.S. PATENT DOCUMENTS

| 3,253,459 | 5/1966 | Sorenson et al. | 73/861.54 X |
| 3,440,878 | 4/1969 | Sargent | 73/239 |
| 3,937,083 | 2/1976 | Sabatino et al. | 73/224 |
| 4,379,226 | 4/1983 | Sichling et al. | 73/DIG. 1 |

FOREIGN PATENT DOCUMENTS 2553454  6/1977  Fed. Rep. of Germany ........ 73/239

Primary Examiner—Herbert Goldstein

[57] ABSTRACT

A magnetic signal pickup mechanism is presented. The mechanism comprises an orbiting mass fixedly coupled to a cyclically repetitively moving element which by moving through its cycle causes the mass to orbit. A relatively tight but slightly moveable wire is coupled to selected points at each end so as to pass near at least one part of the orbit of the mass. One of the mass and the wire is ferro magnetic and the other of the mass and the wire is a permanent magnet sufficiently powerful so that the wire moves one cycle in an orbit in response to each orbit of the mass. A signal detector is coupled to the wire to count orbits of the wire.

7 Claims, 4 Drawing Sheets

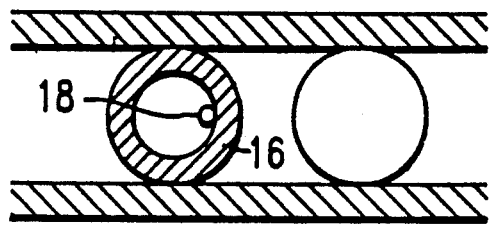
FIG. 11
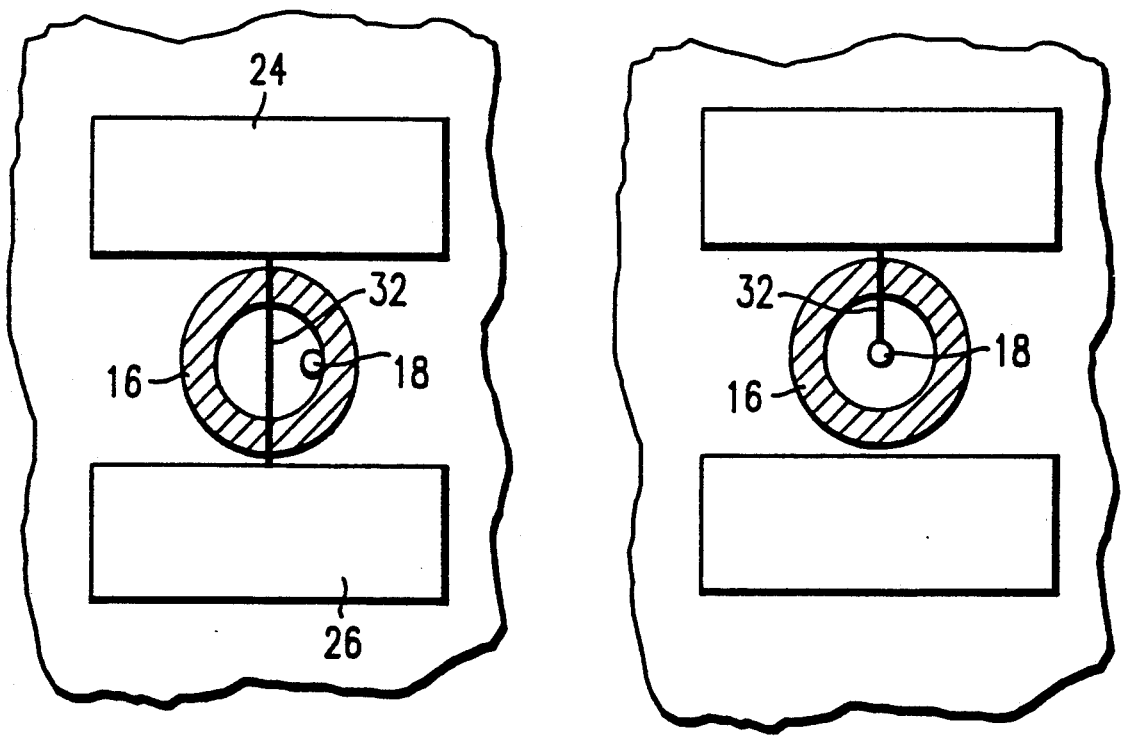
FIG. 12
FIG. 13

SIGNAL PICKUP MECHANISM

BACKGROUND OF THE INVENTION

1. Field of the Invention

The present invention relates to signal pickup mechanisms, and more particularly magnetic signal pickup mechanisms useful in picking up signals from nutators and the like.

2. Description of the Prior Art

Nearly all flow meter pickup mechanisms utilize analog variable reluctance sensing mechanisms. One limitation of these prior art mechanisms is that they are velocity dependant. Consequently, at low velocities, the signal can be very weak and difficult to differentiate from noise. In addition, the prior art devices are all relatively expensive, considering the relatively simple task they perform, when one considers them and compares them to the cost of other unrelated devices performing similar but unrelated functions.

One problem found in many prior art applications involving moving magnets is the magnetic coupling to an outside magnetic element causes magnetic stiction thereby inhibiting motion by a moving element at low velocities. What is needed, but not known to the prior art is a substantial reduction of the flow meter pickup mechanism magnetic coupling force.

The present invention attempts to solve these problems of the prior art devices by utilizing a more efficient design which permits use of a tiny wire having relatively insignificant mass and reacting with a magnetic mass with minimal stiction. The present invention does not rely on velocity for the strength of the signal. The present design utilizes interruption alternated with non interruption of energy to generate a digital output.

SUMMARY OF THE INVENTION

A magnetic signal pickup mechanism is presented which comprises a moving magnetic element mass, a moveable magnetic element wire and a signal detector.

The moving magnetic element mass is fixedly coupled to a moving element which by moving causes the magnetic element mass to move. The mass may comprise a permanent or other magnet, or in the alternative, a ferro magnetic mass.

The moveable magnetic element wire is coupled magnetically only to the magnetic element mass, although the wire may be coupled non magnetically to other structures so long as part of the wire is loose enough to move in response to magnetic force generated by movement of the mass. The wire, being loose and able to move within selected limits attempts to track the mass and remain as close as possible to the mass and passes near at least one selected part of the movement path of the mass, wherein one of the mass and the wire is ferro magnetic and the other of the mass and the wire is a permanent or electro magnet sufficiently powerful so that the wire moves as a function of proximate passes of the mass, since the wire is substantially less massive than the mass.

A signal detector is coupled to the wire to count selected movements of the wire which counting counts selected movements of the mass which in turn counts selected movements of whatever is moving and is coupled to the mass and moves in tandem or otherwise as a function of mass movement.

In a first example, the wire passes inside a hollow fulcrum of a nutator and the mass is coupled to the barrier between the two pistons of the nutator. Accordingly, the signal detector detects nutations of the nutator.

In the first example or another example of the invention, the signal detector comprises an energy source disposed a short distance from an energy sensor, and the movement of the mass causes the wire to move between the source and the sensor, selectively interrupting the transmission of energy from the source to the sensor, thereby generating a signal in response to mass movement.

In another example, one magnetic element is coupled adjacent to and inside the exterior surface of a nutating piston and the magnetic element magnetically coupled to the first magnetic element is coupled adjacent to and on a side opposite the interior surface of a cylinder nutatably coupled to the piston.

In still another example, the wire during movement caused by the magnetic coupling to the mass impinges on a signal generator such as a crystal element which may be a piezo electric element or other crystal element.

Another example of the invention utilizes a wire contained within a selected volume which wire is not mechanically coupled during all or at least most of the cycle of the wire in response to magnetic force transmitted between wire and magnetic element mass. The wire may be enclosed within a hollow fulcrum of a two barrier nutator between the two barriers.

DRAWING DESCRIPTION

Reference should be made at this time to the following detailed description which should be read in conjuction with the following drawings of which:

FIG. 11 is an exploded view of the example of FIG. 7;

FIG. 12 is an exploded view of the example of FIG. 9;

FIG. 13 is an exploded view of the example of FIG. 9 showing the magnetic element wire interrupting the energy beam;

DETAILED DESCRIPTION OF THE INVENTION

Figure 1:
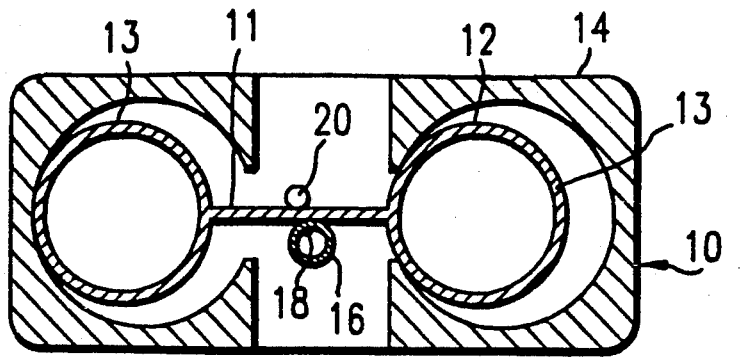
FIG. 1 is a cut away view of the invention.
Figure 2:
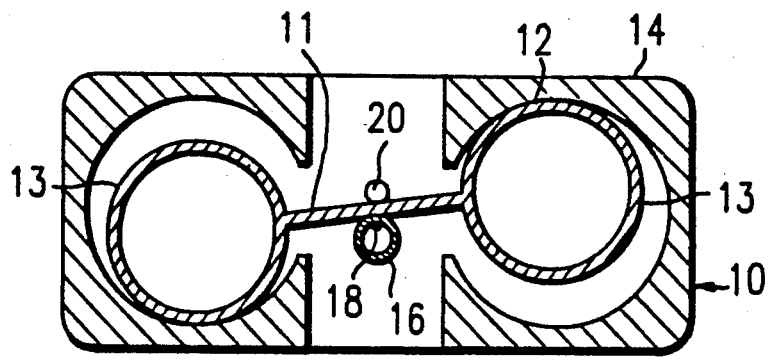
FIG. 2 is a cut away view of the invention
Figure 3:
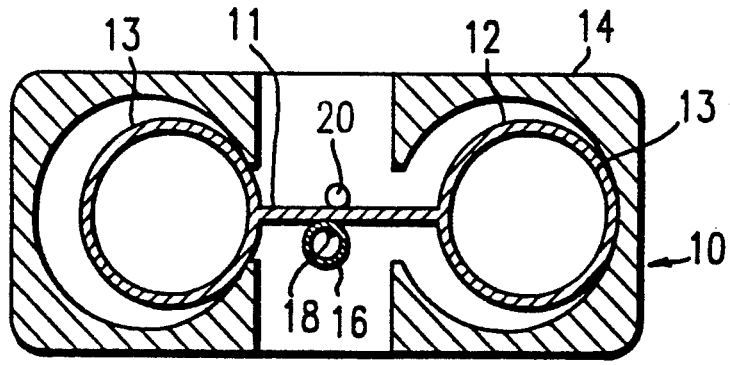
FIG. 3 is a cut away view of the invention.

Reference should be made at this time to FIGS. 1-15 which should be viewed in conjunction with the following detailed description, starting with FIG. 1. A magnetic signal pickup mechanism 10 is presented which comprises a moving magnetic element mass 20, a moveable magnetic element wire 18 and a signal detector 24, 26.

The moving magnetic element mass 20 is fixedly coupled to a moving element 18 which by moving causes the magnetic element mass 20 to move. The mass 20 may comprise a permanent or other magnet, or in the alternative, a ferro magnetic mass.

The moveable magnetic element wire 18 is coupled magnetically only to the magnetic element mass 20, although the wire 18 may be coupled non magnetically to other structures so long as part of the wire 18 is loose enough to move in response to magnetic force generated by movement of the mass 20. The wire 18, being loose and able to move within selected limits attempts to track the mass 20 and remain as close as possible to the mass 20 and passes near at least one selected part of the movement path of the mass as depicted in FIGS. 1 through 4, wherein one of the mass 20 and the wire 18 is ferro magnetic and the other of the mass 20 and the wire 18 is a permanent or electro magnet sufficiently powerful so that the wire 18 moves as a function of proximate passes of the mass 20, since the wire 18 is substantially less massive than the mass 20.

A signal detector 24, 26 is coupled to the wire 18 to count selected movements of the wire 18 which counting counts selected movements of the mass 20 which in turn counts selected movements of whatever is moving (such as a nutator 12 as shown in FIGS. 1-4) and is coupled to the mass 20 and moves in tandem or otherwise as a function of mass 20 movement.

Figure 5:
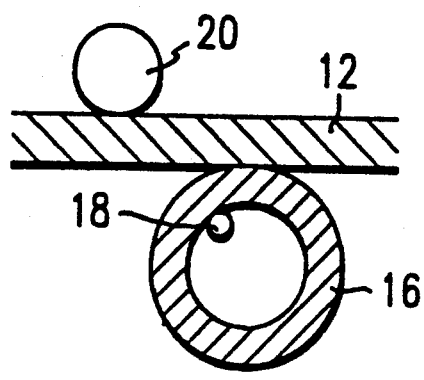
FIG. 5 is an exploded view of FIG. 1.

In a first example as best shown in FIG. 5, the wire 18 passes inside a hollow fulcrum 16 of a nutator 12 and the mass 20 is coupled to the barrier 11 between the two pistons 13 of the nutator 12. Accordingly, the signal detector 24, 26 detects nutations of the nutator 12 or other element (not shown) the movements of which are being counted.

In the first example or another example of the invention, the signal detector 24, 26 comprises an energy source 24 as best shown in FIG. 12 disposed a short distance from an energy sensor 26, and the movement of the mass 20 causes the wire 18 to move between the source 24 and the sensor 26, selectively interrupting the transmission of energy 32 (shown on FIG. 12 and interrupted on FIG. 13) from the source 24 to the sensor 26, thereby generating a signal in response to mass 20 movement.

Figure 4:
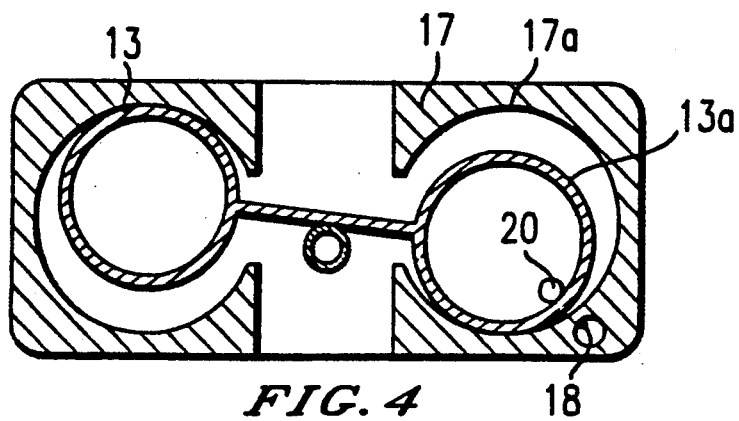
FIG. 4 is a cut away view of the invention.

In another example, one magnetic element 20 is coupled adjacent to and inside the exterior surface 13a of a nutating piston 13 as shown on FIG. 4 and the magnetic element 18 (the wire 18) magnetically coupled to the first magnetic element 20 (the mass 20) is coupled adjacent to and on a side opposite the interior surface 17a of a cylinder 17 nutatably coupled to the piston 13.

Figure 14:
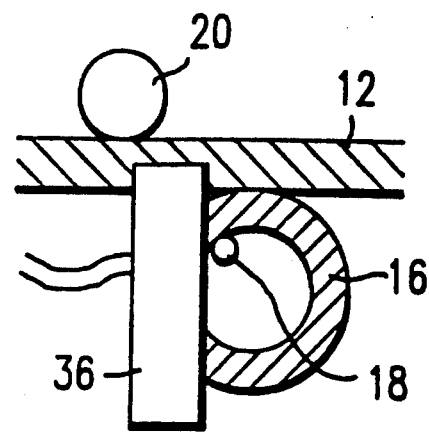
FIG. 14 is an exploded view of FIG. 1 depicting the magnetic element wire impinging on a signal generator.

In still another example test shown on FIG. 14, the wire 18 during movement caused by the magnetic coupling to the mass 20 impinges on a signal generator 36 such as a crystal element which may be a piezo electric element or other element.

Figure 6:
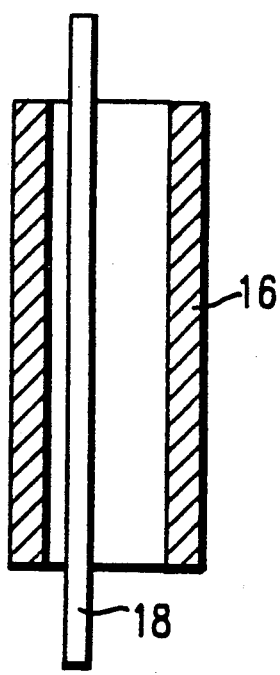
FIG. 6 is an exploded view of the fulcrum and magnetic element wire relationship.
Figure 15:
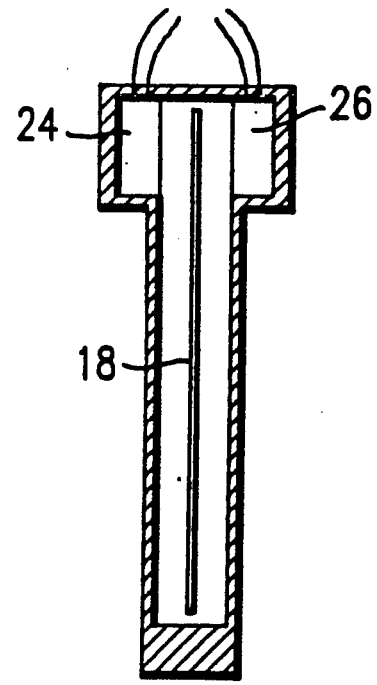
FIG. 15 illustrates a different package of the elements described herein.

As best shown in FIG. 6, the wire may be substantially free moving within a selected volume.

Figure 7:
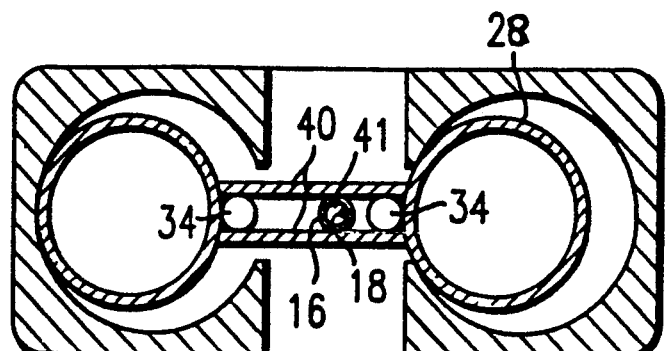
FIG. 7 is a cut away view of another example of the invention using two nutator barriers and two masses.
Figure 8:
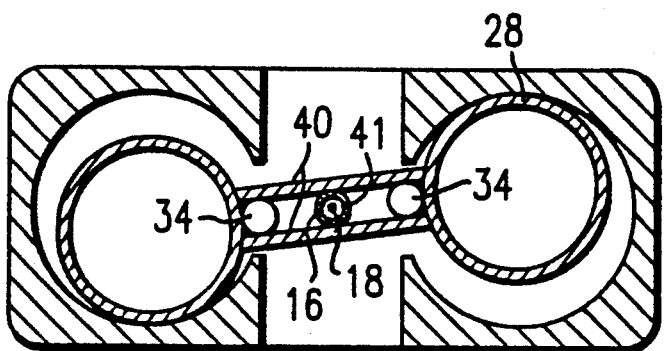
FIG. 8 illustrates the example of FIG. 7 during a different part of the example's cycle.
Figure 9:
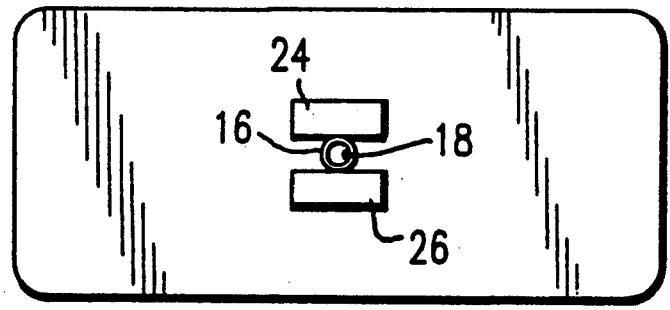
FIG. 9 is an outside elevation view of an example of the invention.
Figure 10:
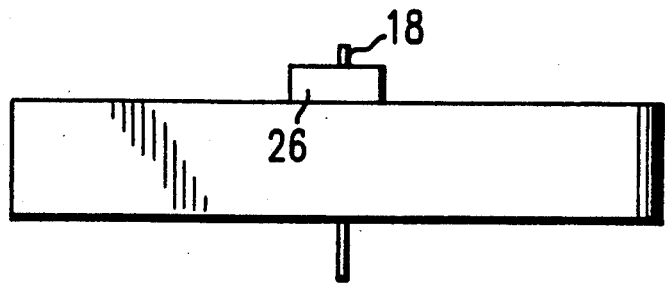
FIG. 10 is an outside side view of the example of FIG. 9.

FIG. 7 illustrates an example with two nutator barriers 40 and two magnetic element masses 34. FIG. 8 illustrates the example of FIG. 7 during a different part of its cycle. FIGS. 9 and 10 are an outside elevation and side views of an example of the invention. FIG. 11 is an exploded view of FIG. 7. FIGS. 12 and 13 are exploded views of FIG. 9.

An example of the invention has been disclosed herein along with additional examples. The invention is limited only by the following claims.

Another example of the invention 10 as best shown on FIGS. 7, 8, and 11 utilizes a wire 18 contained within a selected volume 41 which wire 18 is not mechanically coupled during all or at least most of the cycle of the wire 18 in response to magnetic force transmitted between wire 18 and magnetic element masses 34. The wire 18 may be enclosed within a hollow fulcrum 16 of a two barrier nutator 28 between the two barriers 40.

I claim:

1. In a positive displacement nutating flow meter having a hollow fulcrum supporting a nutator, the nutator including two pistons connected by a barrier, the improvement comprising a magnetic signal pickup mechanism, comprising:

a moving magnetic element mass fixedly coupled to a moving element which moves in response to movement of the nutator and which by moving causes the magnetic element mass to move;

a moveable magnetic element wire coupled magnetically only to the magnetic element mass to track the mass and remain as close as possible to the mass and pass near at least one selected part of the movement path of the mass, wherein one of the mass and the wire is ferro magnetic and the other of the mass and the wire is a permanent magnet sufficiently powerful so that the wire moves as a function of proximate passes of the mass; and a signal detector coupled to the wire to count selected movements of the wire.

2. The invention of claim 1 wherein the wire passes inside the hollow fulcrum and the mass is coupled to the barrier between the two pistons of the nutator.

3. The invention of claim 1 wherein the signal detector comprises an energy source disposed a short distance from an energy sensor, and the movement of the mass causes the wire to move between the source and the sensor, selectively interrupting the transmission of energy from the source to the sensor.

4. The invention of claim 1 wherein one magnetic element is coupled adjacent to and inside the exterior surface of a nutating piston and the magnetic element magnetically coupled to the first magnetic element is coupled adjacent to and on a side opposite the interior surface of a cylinder nutatably coupled to the piston.

5. The invention of claim 1 wherein the wire during movement caused by the magnetic coupling to the mass impinges on a signal generator.

6. The invention of claim 1 wherein the wire is contained within a selected volume but is not mechanically coupled during most of the cycle of the wire.

7. The invention of claim 6 wherein the wire is enclosed within the hollow fulcrum of a two barrier nutator between the two barriers.

* * * * *